United States Patent
Sato et al.

(10) Patent No.: US 12,552,390 B2
(45) Date of Patent: Feb. 17, 2026

(54) VEHICLE THAT DETECTS ROAD SURFACE INFORMATION USING CONTACT DETECTORS AND CONTACTLESS DETECTORS

(71) Applicant: SUBARU CORPORATION, Tokyo (JP)

(72) Inventors: Fumiya Sato, Tokyo (JP); Yoshinobu Yamazaki, Tokyo (JP); Akihiro Nabeshima, Tokyo (JP); Yoshiyuki Jin, Tokyo (JP); Takeshi Yoneda, Tokyo (JP); Hiroshi Kusano, Tokyo (JP); Keigo Yamada, Tokyo (JP); Takumi Araki, Tokyo (JP); Shuntaro Miura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 276 days.

(21) Appl. No.: 18/140,815

(22) Filed: Apr. 28, 2023

(65) Prior Publication Data

US 2023/0382390 A1 Nov. 30, 2023

(30) Foreign Application Priority Data

May 26, 2022 (JP) .................................. 2022-086179

(51) Int. Cl.
*B60W 40/068* (2012.01)
(52) U.S. Cl.
CPC ....... *B60W 40/068* (2013.01); *B60W 2520/26* (2013.01); *B60W 2552/40* (2020.02)
(58) Field of Classification Search
None
See application file for complete search history.

(56) References Cited

U.S. PATENT DOCUMENTS

| 2012/0049617 A1* | 3/2012 | Furuyama ............. B60T 13/662 303/9.75 |
| 2020/0172065 A1* | 6/2020 | Watanabe ........... B60W 40/068 |

(Continued)

FOREIGN PATENT DOCUMENTS

| JP | 2006-046936 A | 2/2006 |
| JP | 2008-228407 A | 9/2008 |

(Continued)

OTHER PUBLICATIONS

Japanese Office Action dated Nov. 18, 2025 for Japanese Patent Application No. 2022-086179 with machine English translation.

*Primary Examiner* — Christian Chace
*Assistant Examiner* — Shayne M. Gilbertson
(74) *Attorney, Agent, or Firm* — McGinn I.P.Law Group, PLLC

(57) ABSTRACT

A vehicle includes a first detector detecting first information related to a condition of a first road surface; a second detector contactlessly detecting second information related to a condition of a second road surface; and a controller controlling a driving force of the vehicle using a friction coefficient estimated based on the first and/or second information. A processor(s) of the controller execute(s) a process including: determining whether the conditions are of a same type based on the first and second information; when the conditions are of different types, controlling the driving force using a friction coefficient estimated based on the second information as a friction coefficient of the second road surface; and based on determining that the conditions are of the same type, controlling the driving force using a friction coefficient estimated based on the first information as the road surface friction coefficient of the second road surface.

4 Claims, 5 Drawing Sheets

(56) References Cited

U.S. PATENT DOCUMENTS

| | | | | |
|---|---|---|---|---|
| 2020/0257292 A1* | 8/2020 | Zhao | ................... | G05D 1/0088 |
| 2022/0126864 A1* | 4/2022 | Moustafa | ......... | G08G 1/096758 |
| 2023/0256972 A1* | 8/2023 | Roy | ................... | B60W 40/068 |
| | | | | 73/146 |

FOREIGN PATENT DOCUMENTS

| JP | 2010-014231 A | 1/2010 |
|---|---|---|
| JP | 2019-137175 A | 8/2019 |

* cited by examiner

VEHICLE THAT DETECTS ROAD SURFACE INFORMATION USING CONTACT DETECTORS AND CONTACTLESS DETECTORS

CROSS-REFERENCE TO RELATED APPLICATIONS

The present application claims priority from Japanese Patent Application No. 2022-086179 filed on May 26, 2022, the entire contents of which are hereby incorporated by reference.

BACKGROUND

The disclosure relates to a vehicle.

Conventionally, there are vehicles that control the driving force of the vehicle's drive wheels in order to prevent the drive wheels from slipping. For example, Japanese Unexamined Patent Application Publication (JP-A) No. 2008-228407 discloses technology for estimating the friction coefficient of the road surface in front of the vehicle based on an image of the road surface in front of the vehicle captured with a camera, calculating the maximum driving force of the drive wheels based on the friction coefficient, and controlling the driving force of the drive wheels so as to fall within the range of the maximum driving force.

SUMMARY

An aspect of the disclosure provides a vehicle. The vehicle includes a first detector, a second detector, and a controller. The first detector is configured to detect first road surface information related to a road surface condition of a first road surface. The first road surface is a road surface at a current position that the vehicle's drive wheels are in contact with. The second detector is configured to contactlessly detect second road surface information related to a road surface condition of a second road surface. The second road surface is a road surface positioned in front of the vehicle. The controller is configured to control a driving force of the vehicle using a road surface friction coefficient estimated based on one or both of the first road surface information and the second road surface information. The controller includes one or more processors, and one or more memories coupled to the one or more processors. The one or more processors are configured to execute a process including: determining whether the road surface condition of the first road surface and the road surface condition of the second road surface are of a same type of road surface condition based on the first road surface information and the second road surface information; based on determining that the road surface condition of the first road surface and the road surface condition of the second road surface are of different types of road surface conditions, controlling the driving force of the vehicle using a second road surface friction coefficient estimated based on the second road surface information as a road surface friction coefficient of the second road surface; and based on determining that the road surface condition of the first road surface and the road surface condition of the second road surface are of the same type of road surface condition, controlling the driving force of the vehicle using a first road surface friction coefficient estimated based on the first road surface information, instead of the second road surface friction coefficient, as the road surface friction coefficient of the second road surface.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

As in JP-A No. 2008-228407, by estimating the friction coefficient of the road surface in front of the vehicle using a non-contact sensor such as a camera, the driving force or the like can be controlled in advance before the vehicle travels on the road surface ahead, and slipping can be prevented. However, non-contact sensors such as cameras have a lower accuracy for estimating the friction coefficient of the road surface than contact sensors installed on the drive wheels or the like. Therefore, there has been a possibility that, based on the friction coefficient of the road surface estimated by a non-contact sensor such as a camera, the driving force cannot be appropriately controlled by setting an appropriate upper limit of the driving force.

Therefore, it is desirable to appropriately control the driving force of the vehicle.

Hereinafter, embodiments of the disclosure will be described in detail with reference to the accompanying drawings. Specific dimensions, materials, numerical values, and the like discussed in these embodiments are merely examples for facilitating understanding of the disclosure, and do not limit the disclosure unless otherwise stated. In the present specification and the drawings, for elements having substantially the same functions and configurations, overlapping descriptions are omitted by denoting them by the same reference symbols, and elements not directly related to the disclosure are omitted from the illustrations.

Figure 1:
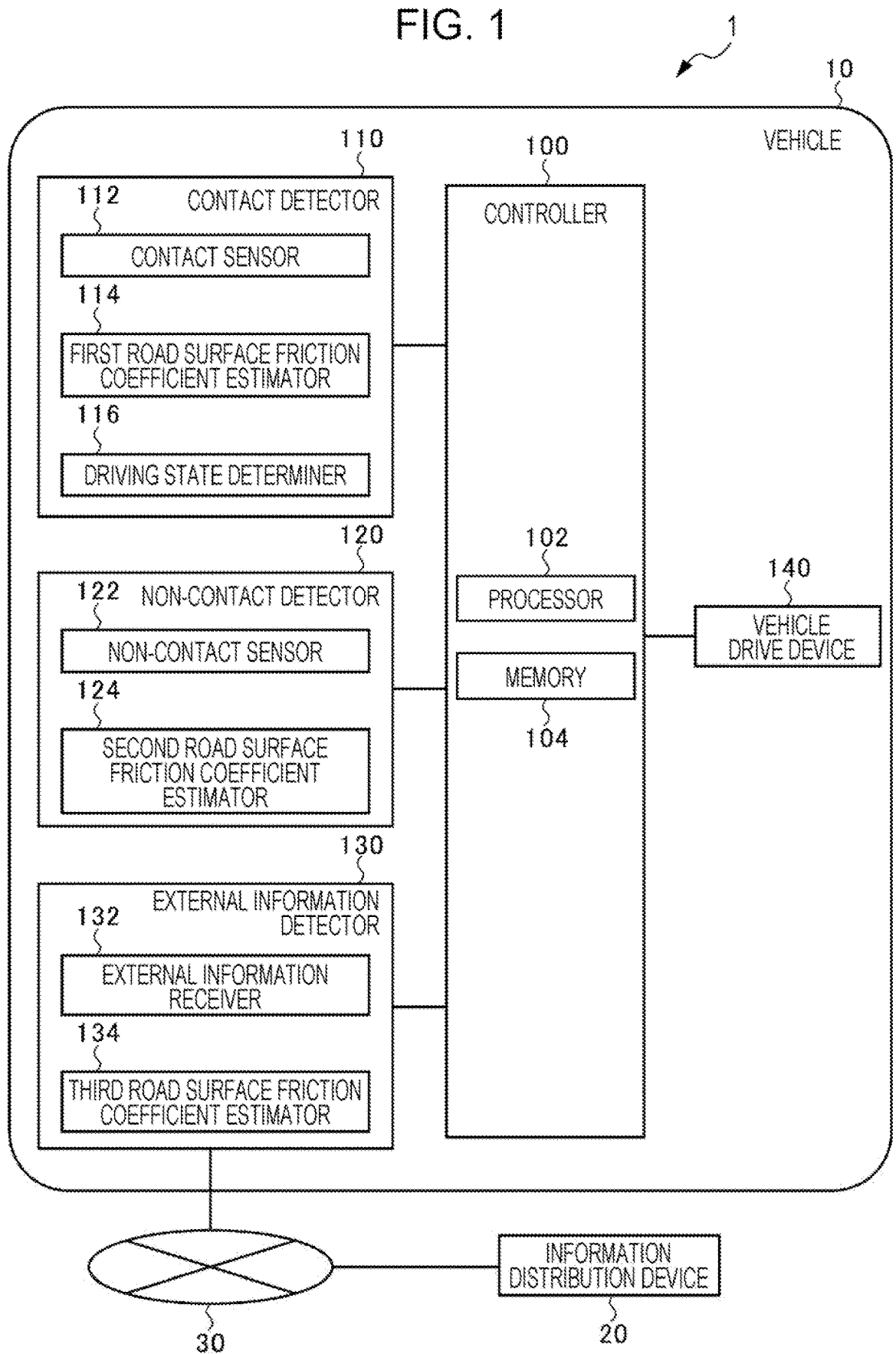
FIG. 1 is a schematic diagram illustrating the overall configuration of a vehicle control system equipped with a vehicle according to an embodiment.

1. Overall Configuration of Vehicle According to First Embodiment and Vehicle Control System First, with reference to FIG. 1, the overall configuration of a vehicle control system 1 equipped with a vehicle 10 according to a first embodiment of the disclosure will be described. FIG. 1 is a schematic diagram illustrating the overall configuration of the vehicle control system 1 equipped with the vehicle 10 according to the first embodiment. As illustrated in FIG. 1, the vehicle control system 1 includes the vehicle 10, an information distribution device 20, and a network 30. The vehicle 10 and the information distribution device 20 are coupled via the network 30.

The vehicle 10 is an automobile that can travel on the road. The vehicle 10 is, for example, an engine vehicle provided with an engine as the driving source for traveling. Note that the vehicle 10 may be a hybrid vehicle provided with an engine and a motor as the driving source for traveling, or may be an electric vehicle provided with a motor as the driving source for traveling. The vehicle 10 may also be an autonomous driving vehicle with an autonomous driving function.

As illustrated in FIG. 1, the vehicle 10 includes a controller 100, a contact detector 110, a non-contact detector 120, an external information detector 130, and a vehicle drive device 140. The vehicle 10 also includes a communication unit capable of transmitting and receiving various types of information wirelessly or wired to and from an external device such as the information distribution device 20.

The controller 100 serves as a vehicle control device that controls the driving force of the vehicle 10. The controller 100 controls the driving force of the vehicle 10 using, for example, a road surface friction coefficient μ estimated based on one or both of first road surface information and second road surface information described later. The road surface friction coefficient μ is, for example, an index that represents the friction state of the road surface. The road surface information is, for example, information directly or indirectly related to the road surface condition of the road surface. As illustrated in FIG. 1, the controller 100 includes a processor 102, and a memory 104 coupled to the processor 102.

The processor 102 is an arithmetic processing unit mounted on a computer. The processor 102 is constituted of a central processing unit (CPU), but may alternatively be constituted of other microprocessors. In addition, the processor 102 may be constituted of one or more processors. The processor 102 executes programs stored in the memory 104 or other storage media, thereby executing various processes in the controller 100.

The memory 104 is a storage medium that stores programs and other various types of data. The memory 104 includes, for example, a random-access memory (RAM) and a read-only memory (ROM). The ROM is a non-volatile memory that stores programs used by the processor 102, data for running the programs, and the like. The RAM is a volatile memory that temporarily stores data such as variables, operation parameters, operation results, and the like used for processing executed by the processor 102. A program stored in the ROM is read into the RAM and executed by the processor 102 such as a CPU.

The contact detector 110 is an example of a first detector. The contact detector 110 includes a contact sensor 112, a first road surface friction coefficient estimator 114, and a driving state determiner 116. The contact sensor 112 may be, for example, one or more of a vehicle speed sensor, a wheel speed sensor for two-wheel drive wheels or four-wheel drive wheels, a steering wheel angle sensor, a yaw rate sensor, an accelerator position sensor, a brake pedal switch, a brake hydraulic pressure sensor, a steering torque sensor, a front and rear acceleration sensor, and a lateral acceleration sensor. Moreover, the contact sensor 112 may be, for example, a sensor provided in the engine to detect engine torque, engine speed, or throttle position, a sensor provided in the transmission to detect turbine speed, transmission gear ratio, or differential limiting clutch engagement torque, or a sensor provided in electric power steering to detect assist force by electric power steering.

The contact sensor 112 detects by contact first road surface information related to the road surface condition of a first road surface, for example. Road surface conditions refer to various conditions related to the road surface, which can affect the frictional force between the drive wheels and the road surface, for example. Road surface conditions are, for example, conditions related to the slipperiness of the road surface. Road surface conditions can be divided into, for example, a high μ road where the road surface friction coefficient μ is greater than or equal to a certain threshold, and a low μ road where the road surface friction coefficient μ is less than the certain threshold. The certain threshold is, for example, 0.5. This is not the only possible case, and road surface conditions may be divided into, for example, three or more categories based on multiple thresholds of the road surface friction coefficient μ. In addition, road surface conditions may be classified according to the type of road surface, such as dry road surface (dry), wet road surface (wet), snowy road surface (snow), and icy road surface (ice). The first road surface is the road surface at the current position that the drive wheels of the vehicle 10 are in contact with. The first road surface information is information directly or indirectly related to the road surface condition of the first road surface, and may be, for example, information related to the operation of the vehicle 10 reflecting the road surface condition of the first road surface. For example, the first road surface information may be one or more of vehicle speed, wheel speed, steering wheel angle, yaw rate, accelerator position, brake actuation signal, brake operation amount, brake hydraulic pressure, front and rear acceleration, lateral acceleration, engine speed, throttle position, engine torque, turbine speed, transmission gear ratio, differential limiting clutch engagement torque, driver steering force, and assist force by electric power steering.

The first road surface friction coefficient estimator 114 estimates a first road surface friction coefficient μ1, which is the road surface friction coefficient μ of the first road surface, based on the first road surface information detected by the contact sensor 112. The first road surface friction coefficient estimator 114 is capable of estimating the first road surface friction coefficient μ1 using multiple types of estimation methods. The driving states determined by the driving state determiner 116 described later mainly include three types: acceleration, deceleration, and turning. Hereinafter, the estimation methods according to the three types of driving states will be described.

First, the method of estimating the first road surface friction coefficient μ1 when the driving state is acceleration will be described. The first road surface friction coefficient estimator 114 calculates a generated braking/driving force based on a demanded driving force input by the driver. Thereafter, the first road surface friction coefficient estimator 114 calculates the generated braking/driving force difference value, which is the difference value between the current value of the generated braking/driving force and the past value of the generated braking/driving force. The first road surface friction coefficient estimator 114 also calculates an estimated braking/driving force based on the engine speed, throttle position, turbine speed, transmission gear ratio, and brake hydraulic pressure detected by the contact sensor 112. Thereafter, the first road surface friction coefficient estimator 114 calculates the estimated braking/driving force difference value, which is the difference value between the current value of the estimated braking/driving force and the past value of the estimated braking/driving force. Then, the first road surface friction coefficient estimator 114 calculates a driving stiffness coefficient based on the generated braking/driving force difference value and the estimated braking/driving force difference value. The first road surface friction coefficient estimator 114 estimates the first road surface friction coefficient μ1 by applying the driving stiffness coefficient and the vehicle speed detected by the contact sensor 112 to a characteristic map. The characteristic map is a map indicating the relationship among the pre-stored driving stiffness coefficient, vehicle speed, and road surface friction coefficient μ.

Next, the method of estimating the first road surface friction coefficient μ1 when the driving state is deceleration will be described. The first road surface friction coefficient estimator 114 calculates the front wheel speed and the rear wheel speed based on the wheel speed detected by the contact sensor 112, and sets the rear wheel speed as the vehicle body speed. Then, the first road surface friction coefficient estimator 114 calculates the vehicle body speed deceleration by differentiating the vehicle body speed. Thereafter, when a certain condition is satisfied, the first road surface friction coefficient estimator 114 calculates the difference in slip rate between the front and rear wheels based on the vehicle body speed, the front wheel speed, and the rear wheel speed, and applies the difference in slip rate between the front and rear wheels and the vehicle body speed deceleration to a determination map to estimate a road surface friction coefficient instantaneous value μM. The determination map is a map indicating the relationship among the pre-stored difference in slip rate between the front and rear wheels, vehicle body speed deceleration, and road surface friction coefficient μ. Thereafter, the first road surface friction coefficient estimator 114 determines whether the state in which a brake activation signal detected by the contact sensor 112 is ON and the vehicle body speed deceleration is greater than or equal to a first threshold (such as 0.5 m/s$^2$) has continued for a certain period of time. Then, when the state has continued for a certain period of time, if the road surface friction coefficient instantaneous value μM is μMH (such as 1.0) or greater and the vehicle body speed deceleration is a second threshold (such as 2.0 m/s$^2$) or greater, if the road surface friction coefficient instantaneous value μM is μMM (such as 0.75) or greater and the vehicle body speed deceleration is a third threshold (such as 1.3 m/s$^2$) or greater, or if the road surface friction coefficient instantaneous value μM is μML (such as 0.3) or greater and the vehicle body speed deceleration is a fourth threshold (such as 0.5 m/s$^2$) or greater, the first road surface friction coefficient estimator 114 updates the first road surface friction coefficient μ1 with the road surface friction coefficient instantaneous value μM.

Finally, the method of estimating the first road surface friction coefficient μ1 when the driving state is turning will be described. First, the first road surface friction coefficient estimator 114 calculates a front wheel friction circle utilization rate based on the engine torque, engine speed, main variable gear ratio, turbine speed, differential limiting clutch engagement torque, yaw rate, and lateral acceleration. Next, the first road surface friction coefficient estimator 114 calculates an estimated rack thrust based on the steering wheel angle, driver steering force, and assist force by electric power steering. The first road surface friction coefficient estimator 114 also calculates a reference rack thrust based on the front wheel slip angle. Note that the front wheel slip angle is calculated based on the steering wheel angle, yaw rate, and vehicle speed. Then, the first road surface friction coefficient estimator 114 calculates the rack thrust deviation based on the estimated rack thrust and the reference rack thrust. Thereafter, the first road surface friction coefficient estimator 114 compares the rack thrust deviation with a maximum value determination threshold, and sets the front wheel friction circle utilization rate as the first road surface friction coefficient μ1 when the rack thrust deviation is greater than or equal to the maximum value determination threshold. When the rack thrust deviation is less than the maximum value determination threshold, the first road surface friction coefficient estimator 114 calculates the first road surface friction coefficient μ1 while restoring the road surface friction coefficient at a restoration speed by referring to a restoration speed map using the vehicle speed and the front wheel slip angle. The restoration speed map is a map in which the restoration speed is set in advance to restore the road surface friction coefficient μ to a predetermined set value based on the vehicle speed and the front wheel slip angle.

As described above, the first road surface friction coefficient estimator 114 estimates the first road surface friction coefficient μ1 using the estimation method based on the acceleration state when the later-described driving state determiner 116 determines that the vehicle 10 is currently accelerating, for example. Note that the same applies to the case where the vehicle 10 is currently decelerating or turning.

The driving state determiner 116 determines the driving state of the vehicle 10 based on the first road surface information detected by the contact sensor 112. The driving state determiner 116 determines that the vehicle 10 is currently accelerating when, for example, the acceleration of the vehicle 10 detected by the contact sensor 112 is greater than or equal to a certain value. This is not the only possible case, and, for example, the driving state determiner 116 may determine that the vehicle 10 is currently accelerating when the contact sensor 112 detects acceleration of the vehicle 10. Moreover, the driving state determiner 116 determines that the vehicle 10 is currently decelerating when, for example, the brake operation amount detected by the contact sensor 112 is greater than or equal to a certain value. This is not the only possible case, and, for example, the driving state determiner 116 may determine that the vehicle 10 is currently decelerating when the contact sensor 112 detects a brake operation amount. Moreover, the driving state determiner 116 determines that the vehicle 10 is currently turning when, for example, the steering wheel angle detected by the contact sensor 112 is greater than or equal to a certain value. This is not the only possible case, and, for example, the driving state determiner 116 may determine that the vehicle 10 is currently turning when the contact sensor 112 detects a steering wheel angle.

As described above, the contact detector 110 detects by contact first road surface information and estimates the first road surface friction coefficient μ1 using the detected first road surface information.

The non-contact detector 120 is an example of a second detector. The non-contact detector 120 includes a non-contact sensor 122 and a second road surface friction coefficient estimator 124. The non-contact sensor 122 may be, for example, one or more of a camera imaging the front of the vehicle 10, an outside air temperature sensor, a road surface temperature sensor, a near infrared ray sensor, and a laser light sensor. The non-contact sensor 122 contactlessly detects, for example, second road surface information related to the road surface condition of a second road surface. The second road surface is a road surface positioned only a certain distance in front of the current position of the vehicle 10, such as a road surface that is about 100 meters ahead. The second road surface information is information directly or indirectly related to the road surface condition of the second road surface, and may be, for example, information related to the condition of the second road surface reflecting the road surface condition of the second road surface. For example, the second road surface information may be one or more of an image of the front of the vehicle 10, outside air temperature, road surface temperature, road surface unevenness, road surface moisture content, and roughness of the road surface in front of the vehicle 10.

The second road surface friction coefficient estimator 124 estimates a second road surface friction coefficient μ2, which is the road surface friction coefficient μ of the second road surface, based on the second road surface information detected by the non-contact sensor 122. In one example, the second road surface friction coefficient estimator 124 applies, for example, the road surface temperature, road surface unevenness, and road surface moisture content detected by the non-contact sensor 122 to a road surface condition map, and determines whether the road surface condition of the second road surface is "dry", "wet", "snow", or ice". This is not the only possible case, and the second road surface friction coefficient estimator 124 may determine, for example, whether the road surface condition of the second road surface is a high μ road, low p road, paved road, unpaved road, asphalt, or concrete. The road surface condition map is a map in which "dry", "wet", "snow", and "ice", which are road surface conditions, are associated according to pre-stored road surface temperature, road surface unevenness, and road surface moisture content. The second road surface friction coefficient estimator 124 estimates the second road surface friction coefficient μ2 to a value in the range of 0.65 to 1.0 when the road surface condition is "dry", and estimates the second road surface friction coefficient μ2 to a value in the range of 0.45 to when the road surface condition is "wet". Moreover, the second road surface friction coefficient estimator 124 estimates the second road surface friction coefficient μ2 to a value in the range of 0.25 to 0.6 when the road surface condition is "snow", and estimates the second road surface friction coefficient μ2 to a value in the range of 0.05 to when the road surface condition is "ice". The second road surface friction coefficient estimator 124 sets, for example, the median value of the range of road surface friction coefficients μ, out of the range of road surface friction coefficients μ determined for each of the road surface conditions described above, as a second road surface friction coefficient μ2. However, this is not the only possible case, and the second road surface friction coefficient estimator 124 may set, for example, the upper limit value or the lower limit value of the range of road surface friction coefficients μ as the second road surface friction coefficient μ2. Moreover, the second road surface friction coefficient estimator 124 may estimate the second road surface friction coefficient μ to any value within the range for each road surface condition, depending on parameters resulting from the road surface conditions (road surface unevenness, water film thickness, snow density, snow moisture content, road surface temperature, etc.), for example.

As described above, the non-contact detector 120 contactlessly detects second road surface information, and estimates the second road surface friction coefficient μ2 using the detected second road surface information.

The external information detector 130 includes an external information receiver 132 and a third road surface friction coefficient estimator 134. The external information receiver 132 is an example of the above-described communication unit, and is coupled to the information distribution device 20 via the network 30. The external information receiver 132 receives, for example, external information related to the road surface condition of a third road surface from the information distribution device 20. The third road surface is a road surface positioned only a certain distance in front of the current position of the vehicle 10, such as a road surface that is about 100 m to several km ahead of the current position of the vehicle 10. The third road surface may include the second road surface. In that case, external information related to the road surface condition of the third road surface may include external information related to the road surface condition of the second road surface. The external information is information directly or indirectly related to the road surface condition of the third road surface, and may be, for example, information related to the condition of the third road surface reflecting the road surface condition of the third road surface. For example, the external information may be one or more of a road image, external air temperature, road surface temperature, road surface unevenness, road surface moisture content, road surface roughness, etc. The external information may also be, for example, road traffic information, icy road information, weather information, slip information of other vehicles, or the like. Various types of external information received by the external information receiver 132 described above may be transmitted to the external information receiver 132, for example, in association with a detection location and a detection time by the information distribution device 20.

The third road surface friction coefficient estimator 134 estimates a third road surface friction coefficient μ3, which is the road surface friction coefficient μ of the third road surface, based on the third road surface information received by the external information receiver 132. As a specific estimation method, the third road surface friction coefficient estimator 134 estimates the third road surface friction coefficient μ3 using the same estimation method as the second road surface friction coefficient estimator 124. This is not the only possible case, and the third road surface friction coefficient estimator 134 may directly detect the road surface condition based on, for example, one or more of road traffic information, icy road information, weather information, and slip information of other vehicles received by the external information receiver 132.

As described above, the external information detector 130 receives external information from the information distribution device 20, and estimates the third road surface friction coefficient μ3 using the received external information.

The vehicle drive device 140 is a motor, an engine, or the like that drives the drive wheels of the vehicle 10. The vehicle drive device 140 is coupled to the controller 100. The vehicle drive device 140 drives the drive wheels in response to, for example, a signal from the controller 100.

The information distribution device 20 is coupled to the vehicle 10 via the network 30, and transmits external information to the vehicle 10. The information distribution device 20 transmits, for example, external information obtained by an information collecting terminal to the vehicle 10. The information distribution device 20 is, for example, a road information providing system, a weather information distribution system, or the like. The information distribution device 20 is not limited to the above systems, and may be, for example, a device that is disposed at various locations of the road surface and that distributes external information to vehicles traveling on a certain section of the road surface. The information collecting terminal is, for example, a camera or a weather observation device disposed at various locations of the road surface. This is not the only possible case, and the information collecting terminal may be, for example, a road surface property measurement vehicle, a snowplow, or other general vehicles. The information collecting terminal is a detection device disposed at various locations of the road surface to detect the road surface condition, and may be, for example, a road surface temperature sensor, a near infrared ray sensor, a laser light sensor, or the like. The information distribution device 20 distributes, for example, one or more of road traffic information, icy road information, and weather information to the vehicle 10. The information distribution device 20 may also distribute, for example, information related to the road surface conditions detected by a road surface property measurement vehicle, a snowplow, or other general vehicles to the vehicle 10, or may distribute information detected by various types of sensors disposed at various locations of the road surface to the vehicle 10.

Figure 2:
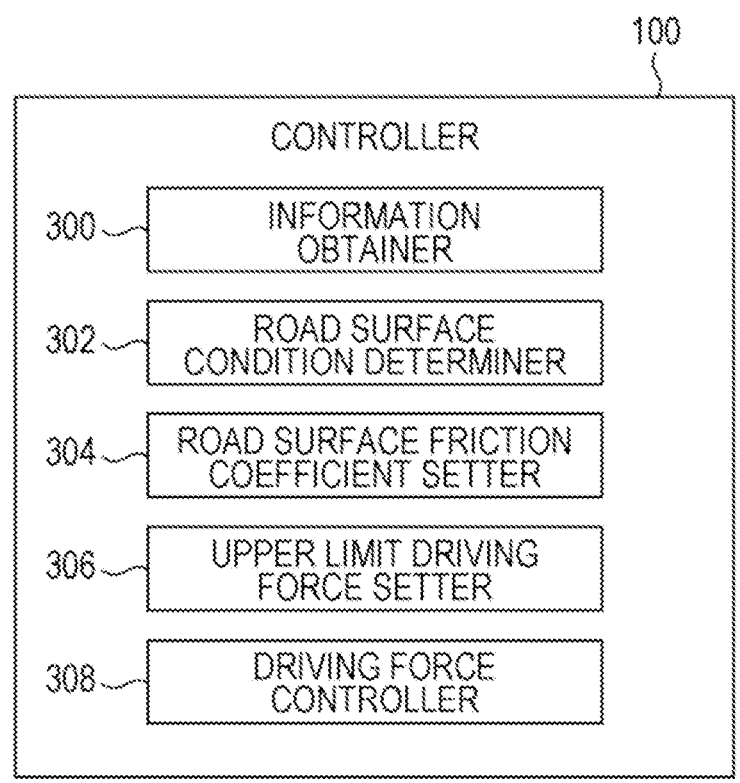
FIG. 2 is a block diagram illustrating an example of the functional configuration of a controller of the vehicle according to the embodiment.
Figure 3:
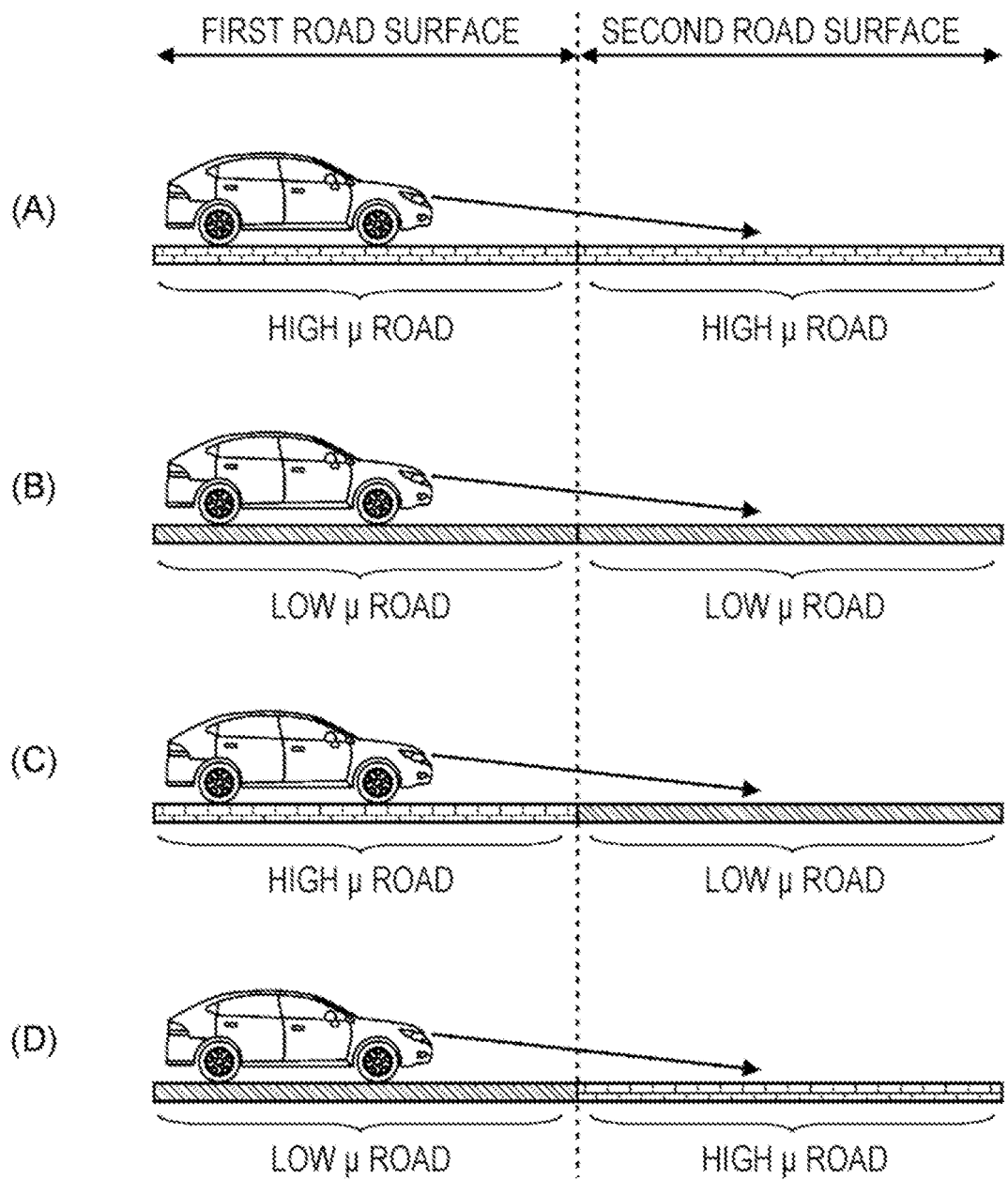
FIG. 3 is a diagram describing control of the vehicle according to the embodiment.

2. Functional Configuration of Controller of Vehicle According to First Embodiment Referring next to FIG. 2, the functional configuration of the controller 100 of the vehicle 10 according to the first embodiment will be described. FIG. 2 is a block diagram illustrating an example of the functional configuration of the controller 100 of the vehicle 10 according to the first embodiment. The functional configuration of the controller 100 of the vehicle 10 according to the first embodiment will also be described using FIG. 3, if necessary. FIG. 3 is a diagram describing control of the vehicle 10 according to the first embodiment. FIG. 3 illustrates four patterns for the combination of the road surface condition of the first road surface and the road surface condition of the second road surface, and describes how the controller 100 performs control processing in each pattern. The four patterns are the following: (A) the same type of road surface condition (high $\mu$ road-high $\mu$ road); (B) the same type of road surface condition (low $\mu$ road-low $\mu$ road); (C) different types of road surface conditions (high $\mu$ road-low $\mu$ road); and (D) different types of road surface conditions (low $\mu$ road-high $\mu$ road). In the four patterns, the road surface condition of the first road surface is indicated before "-", and the road surface condition of the second road surface is indicated after "-".

First, as illustrated in FIG. 2, the controller 100 includes an information obtainer 300, a road surface condition determiner 302, a road surface friction coefficient setter 304, an upper limit driving force setter 306, and a driving force controller 308.

The information obtainer 300 obtains road surface information. The information obtainer 300 obtains, for example, the first road surface information and the first road surface friction coefficient $\mu 1$ detected by the contact detector 110. In addition, the information obtainer 300 obtains, for example, the second road surface information detected by the non-contact detector 120, information representing the road surface condition of the second road surface, and the second road surface friction coefficient $\mu 2$. Moreover, if the second road surface information is undetectable by the non-contact detector 120, the information obtainer 300 obtains the external information received by the external information detector 130, information representing the road surface condition of the third road surface, and the third road surface friction coefficient $\mu 3$.

For example, when the road in front of the vehicle 10 is greatly curved, when the road in front of the vehicle 10 is loosely curved and there is an obstacle inside the curved road, or when the vehicle 10 makes a turn at an intersection, it is not possible to look ahead of the vehicle 10. For example, a camera or laser, which is the non-contact sensor 122, can image or measure the straight road ahead, but cannot image or measure the curved road ahead. In that case, the second road surface information of the road ahead is undetectable by the non-contact detector 120.

For example, when the vehicle 10 is traveling at a high speed, there is a risk that the vehicle 10 will reach the second road surface before the controller 100 estimates the second road surface friction coefficient $\mu 2$ based on the second road surface information and controls the driving force of the vehicle 10. Therefore, it is necessary for the vehicle 10 to obtain road surface information related to the road surface positioned about 100 meters or more ahead of the vehicle 10. However, a camera or laser, which is the non-contact sensor 122, cannot detect road surface information related to the road surface positioned about 100 meters or more ahead of the vehicle 10.

As described above, when the second road surface information is undetectable by the non-contact detector 120, the information obtainer 300 obtains and uses the external information instead of the second road surface information as the road surface information related to the road surface condition of the second road surface.

The road surface condition determiner 302 determines whether the road surface condition of the first road surface and the road surface condition of the second road surface (hereinafter may also be referred to as "two road surface conditions") are of the same type of road surface condition. The road surface condition determiner 302 determines that the two road surface conditions are of the same type of road surface condition when, for example, the two road surface conditions are both high $\mu$ roads or the two road surface conditions are both low $\mu$ roads. This is not the only possible case, and, for example, the road surface condition determiner 302 may determine that the two road surface conditions are of the same type of road surface condition when the two road surface conditions are both any one of "dry", "wet", "snow", or "ice". Moreover, the road surface condition in the case of "dry" or "wet" may be classified as a high $\mu$ road, and the road surface condition in the case of "snow" or "ice" may be classified as a low $\mu$ road. In that case, the road surface condition determiner 302 may determine that the two road surface conditions are of the same type of road surface condition when the two road surface conditions are each "dry" or "wet". Note that the two road surface conditions may be determined similarly as the same type of road surface condition when the two road surface conditions are each "snow" or "ice". Moreover, the road surface condition determiner 302 may determine that the two road surface conditions are of the same type of road surface condition when, for example, one of the two road surface conditions is a high $\mu$ road and the other road surface condition is "dry". Note that, when the combination of one road surface condition and the other road surface condition is the combination of a high $\mu$ road and "wet", the combination of a low $\mu$ road and "snow", or the combination of a low $\mu$ road and "ice", it may be determined similarly to the above that both of the two road surface conditions are of the same type of road surface condition.

The road surface condition determiner 302 determines whether the road surface condition of the first road surface and the road surface condition of the second road surface are of the same type of road surface condition based on, for example, the first road surface friction coefficient $\mu 1$ and the second road surface friction coefficient $\mu 2$.

For example, the road surface condition determiner 302 determines whether the first road surface friction coefficient $\mu 1$ detected by the contact detector 110 is greater than or equal to a certain threshold, and determines whether the road surface condition of the first road surface is a high $\mu$ road or a low $\mu$ road. Note that the road surface condition of the second road surface is similarly determined based on the second road surface friction coefficient $\mu 2$. Thereafter, the road surface condition determiner 302 determines that the road surface condition of the first road surface and the road surface condition of the second road surface are of the same type of road surface condition when the road surface condition of the first road surface and the road surface condition of the second road surface are both high μ roads as illustrated in (A) of FIG. 3 or low μ roads as illustrated in (B) of FIG. 3. Meanwhile, there are cases where the road surface condition of the first road surface is a high μ road and the road surface condition of the second road surface is a low μ road as illustrated in (C) of FIG. 3, or the road surface condition of the first road surface is a low μ road and the road surface condition of the second road surface is a high p road as illustrated in (D) of FIG. 3. In those cases, the road surface condition determiner 302 determines that the road surface condition of the first road surface and the road surface condition of the second road surface are of different types of road surface conditions.

In addition, the road surface condition determiner 302 may determine whether the road surface condition of the first road surface and the road surface condition of the second road surface are of the same type of road surface condition based on, for example, the first road surface friction coefficient μ1 and the road surface condition of the second road surface determined by the non-contact detector 120. In one example, as described above, the road surface condition determiner 302 determines the road surface condition of the first road surface based on the first road surface friction coefficient μ1. Then, the road surface condition determiner 302 determines whether the road surface condition of the first road surface and the road surface condition of the second road surface, which is determined by the non-contact detector 120, such as any one of "dry", "wet", "snow" or "ice", are of the same type of road surface condition. For example, when the road surface condition of the first road surface is a high μ road and the road surface condition of the second road surface is "dry", the road surface condition determiner 302 determines that they are of the same type of road surface condition.

As described above, the road surface condition determiner 302 determines whether the road surface condition of the first road surface and the road surface condition of the second road surface are of the same type of road surface condition based on the first road surface information and the second road surface information. If the second road surface information is undetectable by the non-contact detector 120, the road surface condition determiner 302 determines whether the road surface condition of the first road surface and the road surface condition of the second road surface are of the same type of road surface condition based on the first road surface information and the external information. The specific determination method in that case is the same as that in the case based on the first road surface friction coefficient μ1 and the second road surface friction coefficient μ2 described above, and the case based on the first road surface friction coefficient μ1 and the road surface condition of the second road surface, which is determined by the non-contact detector 120.

In addition, the road surface condition determiner 302 determines whether the road surface condition of the first road surface is better than the road surface condition of the second road surface based on, for example, the first road surface information and the second road surface information. Good road surface conditions are, for example, those with a high road surface friction coefficient μ. For example, as illustrated in (C) of FIG. 3, the road surface condition determiner 302 determines that the road surface condition of the first road surface is better than the road surface condition of the second road surface when the road surface condition of the first road surface is a high μ road and the road surface condition of the second road surface is a low μ road. Alternatively, as illustrated in (D) of FIG. 3, the road surface condition determiner 302 determines that the road surface condition of the first road surface is worse than the road surface condition of the second road surface when the road surface condition of the first road surface is a low μ road and the road surface condition of the second road surface is a high μ road.

Referring back to FIG. 2, the road surface friction coefficient setter 304 sets the road surface friction coefficient μ corresponding to the road surface. The road surface friction coefficient setter 304 sets the first road surface friction coefficient μ1 for the first road surface, for example. Moreover, the road surface friction coefficient setter 304 sets the second road surface friction coefficient μ2 for the second road surface, for example. In the case where the second road surface information is undetectable by the non-contact detector 120, the road surface friction coefficient setter 304 sets the third road surface friction coefficient μ3 for the second road surface.

The road surface friction coefficient setter 304 sets the road surface friction coefficient μ corresponding to each road surface based on the determination result obtained by the road surface condition determiner 302, for example.

For example, as illustrated in (A) of FIG. 3 and (B) of FIG. 3, when it is determined that the road surface condition of the first road surface and the road surface condition of the second road surface are of the same type of road surface condition, the road surface friction coefficient setter 304 sets the road surface friction coefficient μ of the first road surface to the first road surface friction coefficient μ1 estimated based on the first road surface information, and also sets the road surface friction coefficient μ of the second road surface to the first road surface friction coefficient μ1. In this manner, the road surface friction coefficient setter 304 sets the road surface friction coefficient μ for the second road surface to the first road surface friction coefficient μ1 instead of the second road surface friction coefficient μ2. Note that the same applies when the third road surface friction coefficient μ3 is set for the second road surface.

In contrast, for example, as illustrated in (C) of FIG. 3 and (D) of FIG. 3, when it is determined that the road surface condition of the first road surface and the road surface condition of the second road surface are of different types of road surface conditions, the road surface friction coefficient setter 304 sets the road surface friction coefficient μ of the first road surface to the first road surface friction coefficient μ1 estimated based on the first road surface information, and sets the road surface friction coefficient μ of the second road surface to the second road surface friction coefficient μ2 estimated based on the second road surface information. In this manner, in the case of (C) of FIG. 3 and (D) of FIG. 3, the road surface friction coefficient μ for the second road surface is not changed from the second road surface friction coefficient μ2 to the first road surface friction coefficient μ1, but the second road surface friction coefficient μ2 is used as it is.

Referring back to FIG. 2, the upper limit driving force setter 306 calculates the upper limit of the driving force (hereinafter referred to as the "upper limit driving force") of the vehicle 10 using the road surface friction coefficient μ, and sets the upper limit driving force used for controlling the driving force of the vehicle 10 to the calculated upper limit driving force. The upper limit driving force setter 306 calculates the upper limit driving force using the road surface friction coefficient μ set for the second road surface, for example.

For example, the upper limit driving force setter 306 calculates the upper limit driving force of the vehicle 10 using the first road surface friction coefficient μ1 instead of the second road surface friction coefficient μ2 as the road surface friction coefficient μ of the second road surface when the road surface condition of the first road surface and the road surface condition of the second road surface are of the same type of road surface condition. For example, as illustrated in (A) of FIG. 3 and (B) of FIG. 3, when it is determined that the road surface condition of the first road surface and the road surface condition of the second road surface are of the same type of road surface condition, the road surface friction coefficient μ for the second road surface is set to the first road surface friction coefficient μ1. Therefore, in the cases of (A) of FIG. 3 and (B) of FIG. 3, the upper limit driving force setter 306 calculates the upper limit driving force of the vehicle 10 based on the first road surface friction coefficient μ1 set for the second road surface.

In contrast, for example, the upper limit driving force setter 306 calculates the upper limit driving force of the vehicle 10 using the second road surface friction coefficient μ2 as the road surface friction coefficient μ of the second road surface when the road surface condition of the first road surface and the road surface condition of the second road surface are of different types of road surface conditions. For example, as illustrated in (C) of FIG. 3 and (D) of FIG. 3, when it is determined that the road surface condition of the first road surface and the road surface condition of the second road surface are of different types of road surface conditions, the road surface friction coefficient μ for the second road surface is set to the second road surface friction coefficient μ2. In the case of (C) of FIG. 3, the upper limit driving force setter 306 calculates the upper limit driving force of the vehicle based on the second road surface friction coefficient μ2 set for the second road surface, which is a low μ road. In the case of (D) of FIG. 3, the upper limit driving force setter 306 calculates the upper limit driving force of the vehicle 10 based on the first road surface friction coefficient μ1 set for the first road surface, which is a low μ road, which will be described in detail later.

Furthermore, the upper limit driving force setter 306 may calculate the upper limit of the driving force of the vehicle 10 using the road surface friction coefficient μ set for the first road surface, for example, in accordance with the determination result obtained by the road surface condition determiner 302.

For example, when the road surface condition of the first road surface and the road surface condition of the second road surface are of different types of road surface conditions, and the road surface condition of the first road surface is worse than the road surface condition of the second road surface, the upper limit driving force setter 306 calculates the upper limit driving force of the vehicle using the first road surface friction coefficient μ1 as the road surface friction coefficient μ of the first road surface. For example, as illustrated in (C) of FIG. 3 and (D) of FIG. 3, when the road surface condition of the first road surface and the road surface condition of the second road surface are of different types of road surface conditions, the road surface friction coefficient setter 304 sets the first road surface friction coefficient μ1 for the first road surface. In the same case, the road surface friction coefficient setter 304 sets the second road surface friction coefficient μ2 for the second road surface. In that situation, as illustrated in (D) of FIG. 3, when the road surface condition of the first road surface is worse than the road surface condition of the second road surface, the upper limit driving force setter 306 calculates the upper limit driving force using the first road surface friction coefficient μ1 set for the first road surface having a worse road surface condition.

In contrast, for example, when the road surface condition of the first road surface and the road surface condition of the second road surface are of different types of road surface conditions, and the road surface condition of the first road surface is better than the road surface condition of the second road surface, the upper limit driving force setter 306 calculates the upper limit driving force of the vehicle 10 using the second road surface friction coefficient μ2 as the road surface friction coefficient μ of the second road surface. For example, as illustrated in (C) of FIG. 3, when the road surface condition of the first road surface is better than the road surface condition of the second road surface, the upper limit driving force setter 306 calculates the upper limit driving force using the second road surface friction coefficient μ2 set for the second road surface having a worse road surface condition.

Referring back to FIG. 2, the driving force controller 308 controls the driving force of the vehicle 10. The driving force controller 308 controls the driving force of the vehicle 10 based on, for example, the upper limit driving force set by the upper limit driving force setter 306. For example, the driving force controller 308 controls the actual driving force to be less than or equal to the upper driving force when the driving force input by the driver's accelerator operation or the like exceeds the upper limit driving force, and transmits it to the vehicle drive device 140.

In addition, the driving force controller 308 controls the driving force of the vehicle 10 according to, for example, the determination result obtained by the road surface condition determiner 302. For example, as illustrated in (C) of FIG. 3, the driving force controller 308 decelerates the speed of the vehicle 10 when the road surface condition of the first road surface and the road surface condition of the second road surface are of different types of road surface conditions, and the road surface condition of the first road surface is better than the road surface condition of the second road surface. In one example, when the first road surface is a high μ road and the second road surface is a low μ road, the road surface in front of the vehicle 10 (the second road surface) has a lower road surface friction coefficient μ than the road surface on which the vehicle 10 is currently traveling (the first road surface). Therefore, the driving force controller 308 decelerates the speed of the vehicle 10 to a speed corresponding to the road surface friction coefficient μ of the second road surface in advance before rushing into the road surface ahead. As described above, decelerating the speed of the vehicle 10 in advance when the road surface condition in front of the vehicle 10 deteriorates prevents slipping when rushing into the road surface ahead and enables the vehicle 10 to travel more safely.

3. Processing Flow of Controller of Vehicle According to First Embodiment

Figure 4:
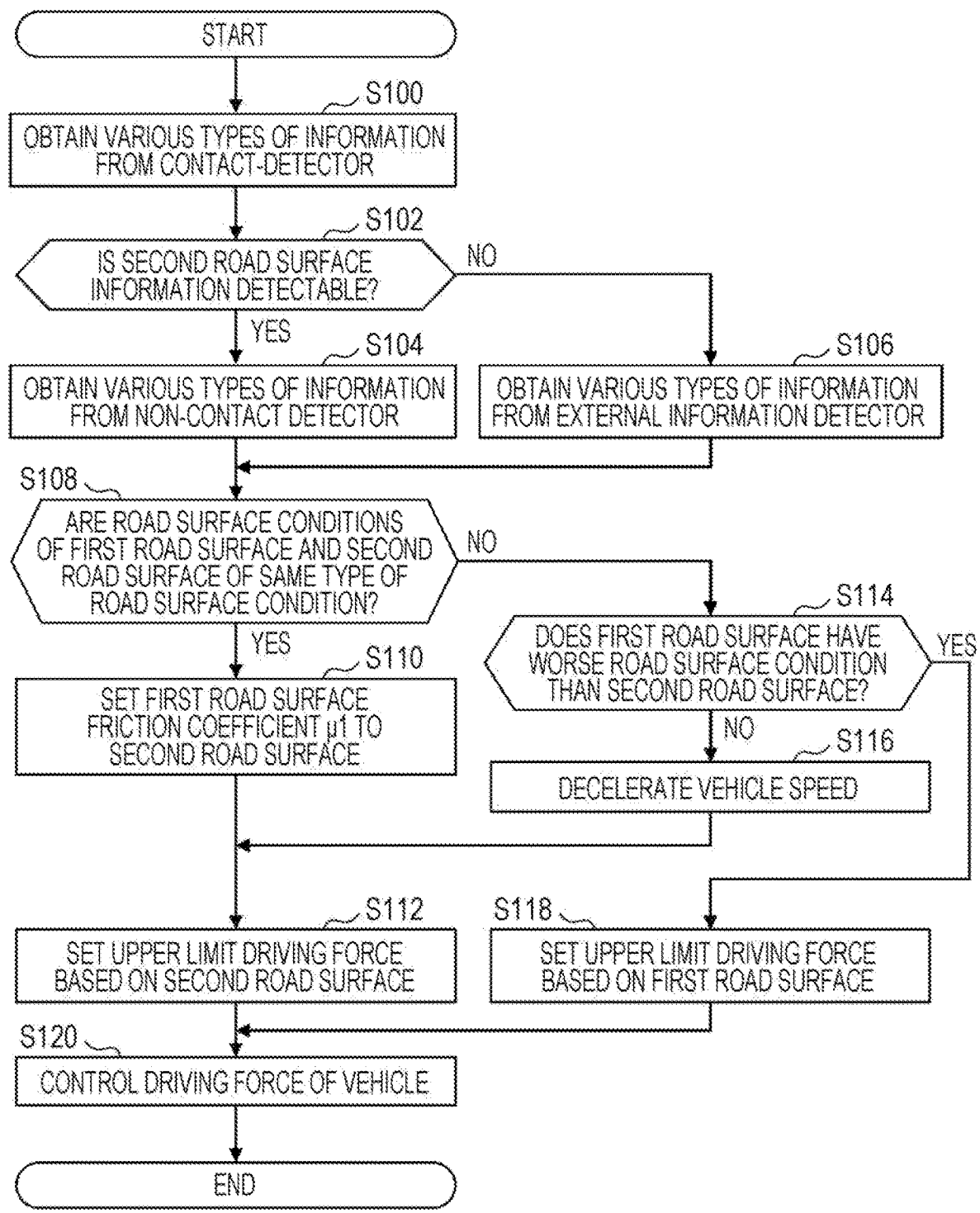
FIG. 4 is a flowchart illustrating a vehicle control process performed by the controller of the vehicle according to the embodiment.

Referring next to FIG. 4, the processing flow of the controller 100 of the vehicle 10 according to the first embodiment will be described. FIG. 4 is a flowchart illustrating a vehicle control process performed by the controller 100 according to the first embodiment.

As illustrated in FIG. 4, first, the information obtainer 300 obtains various types of information from the contact detector 110 (step S100). In one example, the information obtainer 300 obtains the first road surface information and the first road surface friction coefficient μ1 from the contact detector 110. Next, the road surface friction coefficient setter 304 sets the road surface friction coefficient μ of the first road surface to the first road surface friction coefficient μ1.

Thereafter, the information obtainer 300 determines whether the second road surface information is detectable by the non-contact detector 120 (step S102).

As a result, if it is determined that the second road surface information is detectable by the non-contact detector 120 (YES in step S102), the information obtainer 300 obtains various types of information from the non-contact detector 120 (step S104). In one example, the information obtainer 300 obtains the second road surface information, information indicating the road surface condition of the second road surface, and the second road surface friction coefficient μ2 from the non-contact detector 120. Next, the road surface friction coefficient setter 304 sets the road surface friction coefficient μ of the second road surface to the second road surface friction coefficient μ2.

In contrast, if it is determined that the second road surface information is undetectable by the non-contact detector 120 (NO in step S102), the information obtainer 300 obtains various types of information from the external information detector 130 (step S106). In one example, the information obtainer 300 obtains the external information, information indicating the road surface condition of the third road surface, and the third road surface friction coefficient μ3 from the external information detector 130. Next, the road surface friction coefficient setter 304 sets the road surface friction coefficient μ of the second road surface to the third road surface friction coefficient μ3.

After various types of information are obtained from the non-contact detector 120 in step S104 described above or after various types of information are obtained from the external information detector 130 in step S106 described above, the road surface condition determiner 302 determines whether the road surface condition of the first road surface and the road surface condition of the second road surface are of the same type of road surface condition (step S108).

As a result, if it is determined that the road surface conditions of the first road surface and the second road surface are of the same type of road surface condition (YES in step S108), the road surface friction coefficient setter 304 sets the road surface friction coefficient μ of the second road surface to the first road surface friction coefficient μ1 instead of the second road surface friction coefficient μ2 (step S110).

Thereafter, the upper limit driving force setter 306 calculates the upper limit driving force of the vehicle 10 based on the road surface friction coefficient μ of the second road surface, and sets the upper limit driving force used for controlling the driving force of the vehicle 10 to the calculated upper limit driving force (step S112).

In contrast, if it is determined in step S108 that the two road surface conditions are not of the same type of road surface condition (NO in step S108), the road surface condition determiner 302 determines whether the road surface condition of the first road surface is worse than the road surface condition of the second road surface (step S114).

As a result, if it is determined that the road surface condition of the first road surface is better than the road surface condition of the second road surface (NO in step S114), the driving force controller 308 decelerates the traveling speed of the vehicle 10 by the amount of deceleration corresponding to the second road surface friction coefficient μ2 (step S116), and moves the process to step S112.

In contrast, if it is determined in step S114 that the first road surface has a road surface condition worse than that of the second road surface (YES in step S114), the upper limit driving force setter 306 calculates the upper limit driving force based on the road surface friction coefficient μ of the first road surface. Next, the upper limit driving force setter 306 sets the upper limit driving force used for controlling the driving force of the vehicle 10 to the calculated upper limit driving force (step S118).

After the upper limit driving force is set in step S112 described above or after the upper limit driving force is set in step S118 described above, the driving force controller 308 controls the driving force of the vehicle 10 based on the set upper limit driving force (step S120), and ends the vehicle control process.

As described above, according to the first embodiment, when the road surface condition of the first road surface and the road surface condition of the second road surface are of the same type of road surface condition, the driving force of the vehicle 10 is controlled using the first road surface friction coefficient μ1 obtained by the contact detector 110 as the road surface friction coefficient μ of both the first road surface and the second road surface. In this manner, when the road surface conditions of the first road surface and the second road surface are of the same type of road surface condition, the first road surface friction coefficient μ1 having a high estimation accuracy is used instead of the second road surface friction coefficient μ2 having a poor estimation accuracy. This makes it possible to set a more appropriate upper limit driving force to appropriately control the driving force of the vehicle 10, and to suppress traveling malfunctions such as slipping.

According to the first embodiment, when the road surface condition of the first road surface and the road surface condition of the second road surface are of different types of road surface conditions, the driving force of the vehicle 10 is controlled using the second road surface friction coefficient μ2 obtained by the non-contact detector 120 as the road surface friction coefficient μ of the second road surface. This makes it possible to prevent the driving force of the vehicle 10 from being controlled using the road surface friction coefficients μ of a different type of road surface condition and to suppress driving malfunctions such as slipping.

Moreover, according to the first embodiment, when the road surface condition of the first road surface and the road surface condition of the second road surface are of different types of road surface conditions, and the road surface condition of the first road surface is worse than the road surface condition of the second road surface, the driving force of the vehicle 10 is controlled using the first road surface friction coefficient μ1 representing the road surface condition of the first road surface. This makes it possible to prevent the driving force from being controlled based on the second road surface friction coefficient μ2 which is a high numerical value even though the road surface friction coefficient μ of the first road surface on which the vehicle 10 is currently traveling is low. Accordingly, a more appropriate upper limit driving force can be set to appropriately control the driving force of the vehicle 10, and slipping and the like on the road surface on which the vehicle 10 is currently traveling can be suppressed.

According to the first embodiment, when the second road surface information of the second road surface is undetectable by the non-contact detector 120, the external information is received from the information distribution device 20 using the external information detector 130. Using the external information, the road surface condition of the third road surface in front of the vehicle 10 is estimated. This allows the vehicle 10 to be properly controlled in accordance with the road surface condition in front of the vehicle 10 even if the second road surface information of the second road surface is undetectable by the non-contact detector 120, and the driving force of the vehicle 10 can be stably and appropriately controlled.

4. Functional Configuration of Controller of Vehicle According to Second Embodiment Next, the vehicle control system 1 equipped with the vehicle 10 according to a second embodiment of the disclosure, will be described in detail. Note that the second embodiment, which is a modification of the first embodiment, will be mainly described below in terms of differences from the first embodiment, and detailed descriptions of the configurations and functions similar to those of the first embodiment will be omitted.

In the vehicle 10 according to the first embodiment, whether the road surface conditions of the first road surface and the second road surface are of the same type of road surface condition is determined, and the driving force of the vehicle 10 is controlled. In the vehicle 10 according to the second embodiment, when the first road surface and the second road surface are split road surfaces, the driving force of the vehicle 10 is controlled by further determining whether the road surface conditions of the first road surface and the second road surface of the left and right road surfaces are of the same type of road surface conditions. A split road surface is a type of road surface in which the left and right road surfaces relative to the direction of travel of the vehicle 10 have different road surface conditions.

First, the vehicle 10 according to the second embodiment includes the controller 100, the contact detector 110, the non-contact detector 120, the external information detector 130, and the vehicle drive device 140, like the components of the vehicle 10 according to the first embodiment described above.

The controller 100 independently calculates the upper limit driving forces of the left drive wheels and the right drive wheels using, for example, the road surface friction coefficients $\mu$ of the left road surface and the right road surface, and controls the driving force of the vehicle 10. The road surface friction coefficient $\mu$ of the left road surface is, for example, a road surface friction coefficient $\mu$ estimated based on one or both of left first road surface information and left second road surface information described later. In addition, the road surface friction coefficient $\mu$ of the right road surface is, for example, a road surface friction coefficient $\mu$ estimated based on one or both of right first road surface information and right second road surface information described later.

The controller 100 calculates the upper limit driving force of the left drive wheels based on a left first road surface friction coefficient $\mu 1L$ or a left second road surface friction coefficient $\mu 2L$ described later, and sets the upper limit driving force used for controlling the driving force of the left drive wheels to the calculated upper limit driving force. The controller 100 also calculates the upper limit driving force of the right drive wheels based on a right first road surface friction coefficient $\mu 1R$ or a right second road surface friction coefficient $\mu 2R$ described later, and sets the upper limit driving force used for controlling the driving force of the right drive wheels to the calculated upper limit driving force. Then, the controller 100 controls the driving force of the vehicle 10 using, for example, the set upper limit driving forces on the drive wheels on the left and right sides.

The contact detector 110 detects by contact, as the road surface condition of the first road surface, the left first road surface information and the right first road surface condition of the first road surface. The left first road surface information is information directly or indirectly related to the road surface condition of the left first road surface, which is the left road surface relative to the direction of travel of the vehicle 10, of the first road surface. For example, the left first road surface information may be information related to the operation of the vehicle 10 reflecting the road surface condition of the left first road surface. In addition, the right first road surface information is information directly or indirectly related to the road surface condition of the right first road surface, which is the right road surface relative to the direction of travel of the vehicle 10, of the first road surface. For example, the right first road surface information may be information related to the operation of the vehicle 10 reflecting the road surface condition of the right first road surface. For example, the left first road surface information and the right first road surface information may be one or more of vehicle speed, wheel speed, steering wheel angle, yaw rate, accelerator position, brake actuation signal, brake operation amount, brake hydraulic pressure, front and rear acceleration, lateral acceleration, engine speed, throttle position, engine torque, turbine speed, transmission gear ratio, differential limiting clutch engagement torque, driver steering force, and assist force by electric power steering.

The contact detector 110 can estimate the left first road surface friction coefficient $\mu 1L$ and the right first road surface friction coefficient $\mu 1R$ using the method of estimating the first road surface friction coefficient $\mu 1$ when the above-described driving state is deceleration. The contact detector 110 detects the left first road surface information and the right first road surface information based on a wheel speed sensor for two-wheel drive wheels, for example. For example, the contact detector 110 detects the left front wheel speed, the right front wheel speed, the left rear wheel speed, and the right rear wheel speed based on a wheel speed sensor for two-wheel drive wheels or the like. Then, the contact detector 110 estimates the left first road surface friction coefficient $\mu 1L$ based on, for example, the left front wheel speed and the left rear wheel speed, and estimates the right first road surface friction coefficient $\mu 1R$ based on the right front wheel speed and the right rear wheel speed. Note that the contact detector 110 may detect the left first road surface information and the right first road surface information based on a wheel speed sensor for four-wheel drive wheels, for example.

The non-contact detector 120 contactlessly detects, as the road surface condition of the second road surface, the left second road surface information and the right second road surface information of the second road surface. The left second road surface information is information directly or indirectly related to the road surface condition of the left second road surface, which is the left road surface relative to the direction of travel of the vehicle 10, of the second road surface. For example, the left second road surface information may be information related to the condition of the left second road surface reflecting the road surface condition of the left second road surface. The right second road surface information is information directly or indirectly related to the road surface condition of the right second road surface, which is the right road surface relative to the direction of travel of the vehicle 10, of the second road surface. For example, the right second road surface information may be information related to the condition of the right second road surface reflecting the road surface condition of the right second road surface. For example, the left second road surface information and the right second road surface information may be one or more of an image of the front of the vehicle 10, outside air temperature, road surface temperature, road surface unevenness, road surface moisture content, and roughness of the road surface in front of the vehicle 10.

The non-contact detector 120 detects the left second road surface information and the right second road surface information at, for example, two locations on the left second road surface and the right second road surface using a camera imaging the front of the vehicle 10, a road surface temperature sensor, a near infrared ray sensor, a laser light sensor, or the like. The left second road surface and the right second road surface are scanned by one of the following sensors: a camera imaging the front of the vehicle a road surface temperature sensor, a near infrared ray sensor, and a laser light sensor. Note that the number of sensors used for scanning is not limited to one, and, for example, multiple sensors of the same type or of different types may be used. In addition, the non-contact detector 120 determines whether the road surface conditions of the left second road surface and the right second road surface are "dry", "wet", "snow", or "ice" based on the detected left second road surface information and right second road surface information. Then, the non-contact detector 120 estimates the left second road surface friction coefficient μ2L and the right second road surface friction coefficient μ2R in accordance with the conditions of the road surfaces.

Next, the controller 100 according to the second embodiment includes the information obtainer 300, the road surface condition determiner 302, the road surface friction coefficient setter 304, the upper limit driving force setter 306, and the driving force controller 308, like the components of the controller 100 according to the first embodiment described above.

Figure 5:
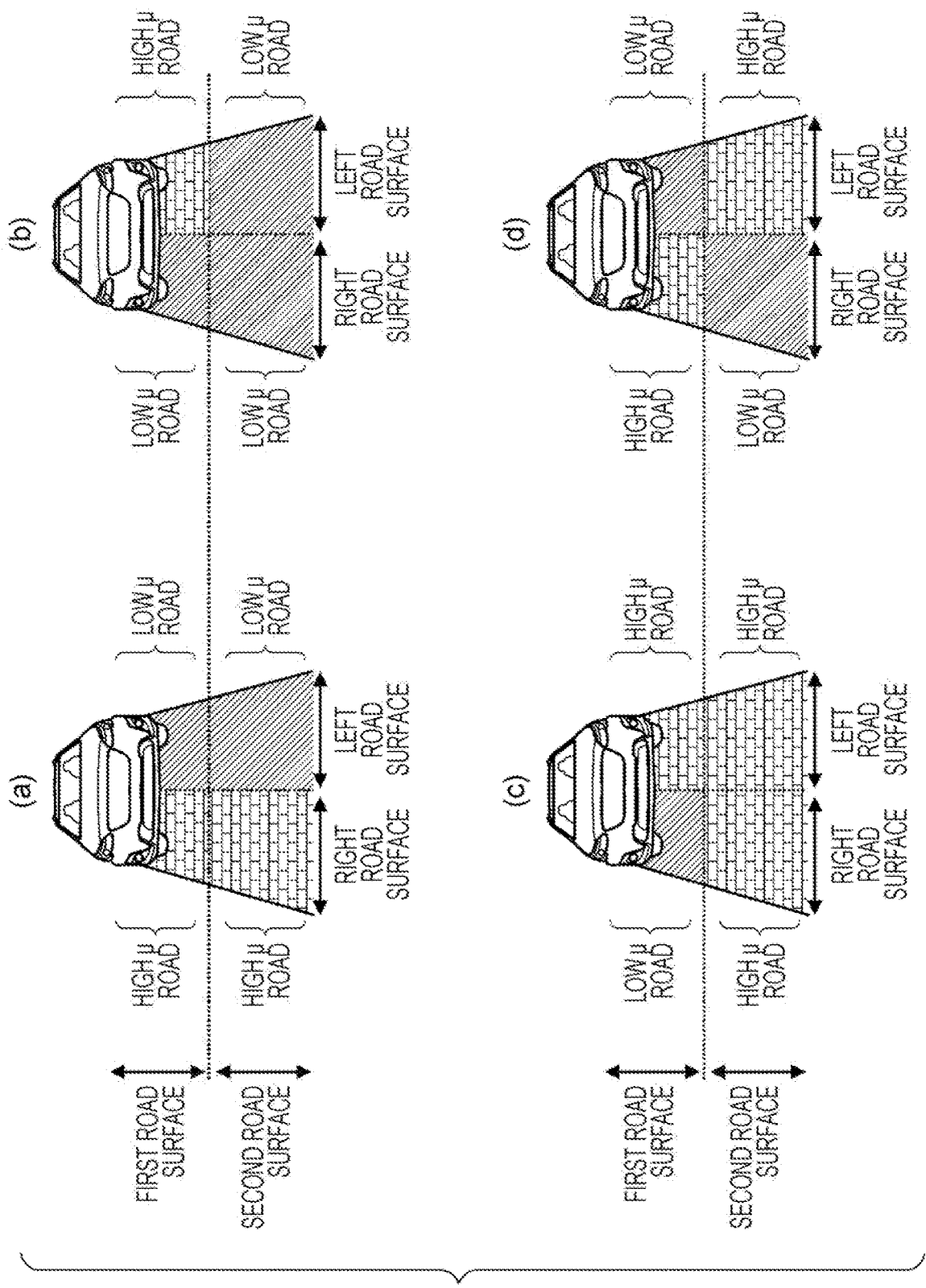
FIG. 5 is a diagram describing control of the vehicle according to an embodiment.

Here, the functional configuration of the controller 100 of the vehicle 10 according to the second embodiment will now be described using FIG. 5, if necessary. FIG. 5 is a diagram describing control of the vehicle 10 according to the second embodiment. FIG. 5 illustrates four patterns for the combination of the road surface conditions of the left first road surface, the left second road surface, the right first road surface, and the right second road surface, and describes how the controller 100 performs control processing in each pattern. Note that the four patterns are the following: (a) the same type of road surface condition on the right side (high μ road-high μ road) and the same type of road surface condition on the left side (low μ road-low p road); (b) the same type of road surface condition on the right side (low μ road-low μ road) and different types of road surface conditions on the left side (high μ road-low p road); (c) different types of road surface conditions on the right side (low μ road-high μ road) and the same type of road surface condition on the left side (high μ road-high μ road); and (d) different types of road surface conditions on the right side (high μ road-low μ road) and different types of road surface conditions on the left side (low μ road-high μ road). In the four patterns, the road surface condition of the first road surface is indicated before "-", and the road surface condition of the second road surface is indicated after "-". In the description of FIG. 5, the right side refers to the right side relative to the vehicle traveling direction, and the left side refers to the left side of the vehicle traveling direction.

The information obtainer 300 obtains, for example, the left first road surface information, the right first road surface information, the left first road surface friction coefficient μ1L, and the right first road surface friction coefficient μ1R detected by the contact detector 110. The information obtainer 300 also obtains, for example, the left second road surface information, the right second road surface information, information indicating the road surface condition of the left second road surface, information indicating the road surface condition of the right second road surface, the left second road surface friction coefficient μ2L, and the right second road surface friction coefficient μ2R detected by the non-contact detector 120.

The road surface condition determiner 302 determines whether the road surface condition of the left first road surface and the road surface condition of the left second road surface are of the same type of road surface condition based on the left first road surface friction coefficient μ1L and the left second road surface friction coefficient μ2L, for example. Moreover, the road surface condition determiner 302 determines whether the road surface condition of the right first road surface and the road surface condition of the right second road surface are of the same type of road surface condition based on the right first road surface friction coefficient μ1R and the right second road surface friction coefficient μ2R, for example.

For example, the road surface condition determiner 302 determines whether the left first road surface friction coefficient μ1L is greater than or equal to a certain threshold, and determines whether the road surface condition of the left first road surface is a high μ road or a low p road. Similarly, the road surface condition determiner 302 determines whether the road surface condition of the left second road surface, the right first road surface, or the right second road surface is a high μ road or a low μ road based on the left second road surface friction coefficient μ2L, the right first road surface friction coefficient μ1R, or the right second road surface friction coefficient μ2R. Thereafter, the road surface condition determiner 302 determines whether the left first road surface and the left second road surface have the same type of road surface condition, and whether the right first road surface and the right second road surface have the same type of road surface condition. For example, the road surface condition determiner 302 determines that the road surfaces have the same type of road surface condition when they are the road surfaces on both sides in FIG. 5(*a*), the road surfaces on the right side in FIG. 5(*b*), and the road surfaces on the left side in FIG. 5(*c*). In addition, the road surface condition determiner 302 determines that the road surfaces have different types of road surface conditions when they are the road surfaces on the left side in FIG. 5(*b*), the road surfaces on the right side in FIG. 5(*c*), and the road surfaces on both sides in FIG. 5(*d*).

As described above, the road surface condition determiner 302 determines whether the road surface condition of the left first road surface and the road surface condition of the left second road surface are of the same type of road surface condition based on the left first road surface information and the left second road surface information. In addition, the road surface condition determiner 302 determines whether the road surface condition of the right first road surface and the road surface condition of the right second road surface are of the same type of road surface condition based on the right first road surface information and the right second road surface information.

Moreover, the road surface condition determiner 302 determines, for example, whether the road surface condition of the left first road surface is better than the road surface condition of the left second road surface, and whether the road surface condition of the right first road surface is better than the road surface condition of the right second road surface. For example, as illustrated in the road surfaces on the left side in FIG. 5(*b*), the road surface condition determiner 302 determines that the road surface condition of the left first road surface is better than the road surface condition of the left second road surface when the road surface condition of the left first road surface is a high μ road and the road surface condition of the left second road surface is a low μ road. In addition, for example, as illustrated in the road surfaces on the right side in FIG. 5(d), the road surface condition determiner 302 determines that the road surface condition of the right first road surface is better than the road surface condition of the right second road surface when the road surface condition of the right first road surface is a high μ road and the road surface condition of the right second road surface is a low μ road. Moreover, for example, as illustrated in the road surfaces on the left side in FIG. 5(d), the road surface condition determiner 302 determines that the road surface condition of the left first road surface is worse than the road surface condition of the left second road surface when the road surface condition of the left first road surface is a low μ road and the road surface condition of the left second road surface is a high μ road. Furthermore, for example, as illustrated in the road surfaces on the right side in FIG. 5(c), the road surface condition determiner 302 determines that the road surface condition of the right first road surface is worse than the road surface condition of the right second road surface when the road surface condition of the right first road surface is a low μ road and the road surface condition of the right second road surface is a high μ road.

Next, the road surface friction coefficient setter 304 sets, for example, the left first road surface friction coefficient μ1L for the left first road surface, and sets the right first road surface friction coefficient μ1R for the right first road surface. The road surface friction coefficient setter 304 also sets, for example, the left second road surface friction coefficient μ2L for the left second road surface, and sets the right second road surface friction coefficient μ2R for the right second road surface.

In addition, the road surface friction coefficient setter 304 sets the road surface friction coefficient μ of the left first road surface to the left first road surface friction coefficient μ1L estimated based on the left first road surface information in the case of the road surfaces on the left side in FIG. 5(a) and the road surfaces on the left side in FIG. 5(c), for example. At the same time, the road surface friction coefficient setter 304 also sets, for example, the road surface friction coefficient μ of the left second road surface to the left first road surface friction coefficient μ1L. In this manner, the road surface friction coefficient setter 304 sets the road surface friction coefficient μ for the left second road surface to the left first road surface friction coefficient μ1L instead of the left second road surface friction coefficient μ2L when it is determined that the road surface conditions of the left first road surface and the left second road surface are of the same type of road surface condition, for example. In addition, the road surface friction coefficient setter 304 sets the road surface friction coefficient μ of the right first road surface to the right first road surface friction coefficient μ1R estimated based on the right first road surface information in the case of the road surfaces on the right side in FIG. 5(a) and the road surfaces on the right side in FIG. 5(b), for example. At the same time, the road surface friction coefficient setter 304 also sets, for example, the road surface friction coefficient μ of the right second road surface to the right first road surface friction coefficient μ1R. In this manner, the road surface friction coefficient setter 304 sets the road surface friction coefficient μ for the right second road surface to the right first road surface friction coefficient μ1R instead of the right second road surface friction coefficient μ2R when it is determined that the road surface conditions of the right first road surface and the right second road surface are of the same type of road surface condition, for example.

In contrast, the road surface friction coefficient setter 304 sets the road surface friction coefficient μ of the left first road surface to the left first road surface friction coefficient μ1L estimated based on the left first road surface information in the case of the road surfaces on the left side in FIG. 5(b) and the road surfaces on the left side in FIG. 5(d), for example. At the same time, the road surface friction coefficient setter 304 sets, for example, the road surface friction coefficient μ of the left second road surface to the left second road surface friction coefficient μ2L estimated based on the left second road surface information. In this manner, the road surface friction coefficient setter 304 uses the left second road surface friction coefficient μ2L as it is without changing the road surface friction coefficient μ for the left second road surface from the left second road surface friction coefficient μ2L to the left first road surface friction coefficient μ1L when it is determined that the road surface conditions of the left first road surface and the left second road surface are of different types of road surface conditions, for example. In addition, the road surface friction coefficient setter 304 sets the road surface friction coefficient μ of the right first road surface to the right first road surface friction coefficient μ1R estimated based on the right first road surface information in the case of the road surfaces on the right side in FIG. 5(c) and the road surfaces on the right side in FIG. 5(d), for example. At the same time, the road surface friction coefficient setter 304 sets, for example, the road surface friction coefficient μ of the right second road surface to the right second road surface friction coefficient μ2R estimated based on the right second road surface information. In this manner, the road surface friction coefficient setter 304 uses the right second road surface friction coefficient μ2R as it is without changing the road surface friction coefficient μ for the right second road surface from the right second road surface friction coefficient μ2R to the right first road surface friction coefficient μ1R when it is determined that the road surface conditions of the right first road surface and the right second road surface are of different types of road surface conditions, for example.

The upper limit driving force setter 306 calculates the upper limit driving force of the left drive wheels using, for example, the road surface friction coefficient μ set for the left second road surface, and calculates the upper limit driving force of the right drive wheels using the road surface friction coefficient μ set for the right second road surface. Then, the upper limit driving force setter 306 sets, for example, the upper limit driving force used for controlling the driving force of the left drive wheels to the calculated upper limit driving force of the left drive wheels, and sets the upper limit driving force used for controlling the driving force of the right drive wheels to the calculated upper limit driving force of the right drive wheels.

Moreover, the upper limit driving force setter 306 calculates the upper limit driving force of the left drive wheels using the road surface friction coefficient μ set for the left first road surface in the case of the road surfaces on the left side in FIG. 5(d), for example. Then, the upper limit driving force setter 306 sets, for example, the upper limit driving force used for controlling the driving force of the left drive wheels to the calculated upper limit driving force of the left drive wheels. In this manner, if it is determined that the road surface condition of the left first road surface is worse than the road surface condition of the left second road surface, for example, the upper limit driving force setter 306 calculates the upper limit driving force of the left drive wheels using the left first road surface friction coefficient μ1L set for the left first road surface having a worse road surface condition. In addition, the upper limit driving force setter 306 calculates the upper limit driving force of the right drive wheels using the road surface friction coefficient μ set for the right first road surface in the case of the road surfaces on the right side in FIG. 5(c), for example. Then, the upper limit driving force setter 306 sets, for example, the upper limit driving force used for controlling the driving force of the right drive wheels to the calculated upper limit driving force of the right drive wheels. In this manner, if it is determined that the road surface condition of the right first road surface is worse than the road surface condition of the right second road surface, for example, the upper limit driving force setter 306 calculates the upper limit driving force of the right drive wheels using the right first road surface friction coefficient μ1R set for the right first road surface having a worse road surface condition.

The driving force controller 308 controls the overall driving force of the vehicle 10 based on, for example, the upper limit driving forces of the left drive wheels and the right drive wheels set by the upper limit driving force setter 306. The driving force controller 308 controls the vehicle 10 by using, for example, the lower of the upper limit driving force of the left drive wheels and the upper limit driving force of the right drive wheels as the overall upper limit driving force of the vehicle 10. This is not the only possible case, and the driving force controller 308 may, for example, control the overall driving force of the vehicle 10 by making the driving force of drive wheels on the left and right sides different when the input driving force exceeds the lower of the upper limit driving force of the left drive wheels and the upper limit driving force of the right drive wheels. For example, in that case, the driving force controller 308 may control the overall driving force of the vehicle 10 by setting the driving force of the drive wheels on the side exceeding the upper limit driving force to the upper limit driving force, and adding the difference between the input driving force and the upper limit driving force to the driving force of the drive wheels on the other side.

As described above, when the road surface condition of the left first road surface and the road surface condition of the left second road surface are of the same type of road surface condition, the controller 100 according to the second embodiment calculates the upper limit driving force of the left drive wheels using the left first road surface friction coefficient μ1L instead of the left second road surface friction coefficient μ2L as the road surface friction coefficient μ of the left second road surface. Moreover, when the road surface condition of the right first road surface and the road surface condition of the right second road surface are of the same type of road surface condition, the controller 100 according to the second embodiment calculates the upper limit driving force of the right drive wheels using the right first road surface friction coefficient μ1R instead of the right second road surface friction coefficient μ2R as the road surface friction coefficient μ of the right second road surface.

Furthermore, when the road surface condition of the left first road surface and the road surface condition of the left second road surface are of different types of road surface conditions, the controller 100 according to the second embodiment calculates the upper limit driving force of the left drive wheels using the left second road surface friction coefficient μ2L as the road surface friction coefficient μ of the left second road surface. Also, when the road surface condition of the right first road surface and the road surface condition of the right second road surface are of different types of road surface conditions, the controller 100 according to the second embodiment calculates the upper limit driving force of the right drive wheels using the right second road surface friction coefficient μ2R as the road surface friction coefficient μ of the right second road surface.

Furthermore, when the road surface condition of the left first road surface and the road surface condition of the left second road surface are of different types of road surface conditions and the road surface condition of the left first road surface is worse than the road surface condition of the left second road surface, the controller 100 according to the second embodiment calculates the upper limit driving force of the left drive wheels using the left first road surface friction coefficient μ1L as the road surface friction coefficient μ of the left first road surface. Moreover, when the road surface condition of the right first road surface and the road surface condition of the right second road surface are of different types of road surface conditions and the road surface condition of the right first road surface is worse than the road surface condition of the right second road surface, the controller 100 according to the second embodiment calculates the upper limit driving force of the right drive wheels using the right first road surface friction coefficient μ1R as the road surface friction coefficient μ of the right first road surface.

As described above, according to the second embodiment, when the first road surface and the second road surface are split road surfaces having different road surface conditions on the left and right sides, whether the road surface conditions are of the same type of road surface condition is determined for each of the left and right sides. This allows appropriate determination of whether the road surface conditions are the same even if the road surface conditions are different on the left and right sides.

According to the second embodiment, the road surface conditions of the first road surface and the second road surface are determined on each of the left and right sides, and according to the results, different road surface friction coefficients μ are applied to set the upper limit driving forces of the drive wheels on the left and right sides. Accordingly, the upper limit driving forces of the drive wheels on the left and right sides on split road surfaces can be accurately calculated, and the driving force of the vehicle 10 can be more optimally controlled.

Although the embodiments of the disclosure have been described above with reference to the accompanying drawings, needless to say, the disclosure is not limited to those embodiments. It is clear for those skilled in the art to be able to conceive of various changes or modifications within the scope of the claims, which are naturally understood to be within the technical scope of the disclosure.

For example, although the example in which the first road surface friction coefficient estimator 114, the second road surface friction coefficient estimator 124, and the third road surface friction coefficient estimator 134 are respectively included in the contact detector 110, the non-contact detector 120, and the external information detector 130 has been described in the above embodiments, this example is not the only possible case. The first road surface friction coefficient estimator 114, the second road surface friction coefficient estimator 124, and the third road surface friction coefficient estimator 134 may be included in the controller 100, for example.

The series of processes according to the above-described embodiments may be realized using software, hardware, or a combination of software and hardware. A program forming the software is stored in advance in, for example, a non-transitory storage medium provided inside or outside each device. The program is then read from the non-transitory storage medium (such as ROM) to a temporary storage medium (such as RAM) and executed by a processor such as a CPU.

According to the above-described embodiments, a program for executing the processing of each function of the above-described controller 100 can also be provided. Furthermore, a computer-readable non-transitory recording medium in which the program is stored can also be provided. The non-transitory recording medium may be, for example, a disk-type recording medium such as an optical disk, magnetic disk, or magneto-optical disk, or a semiconductor memory such as flash memory or Universal Serial Bus (USB) memory.

The controller 100 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 100 including the information obtainer 300, the road surface condition determiner 302, the road surface friction coefficient setter 304, the upper limit driving force setter 306, and the driving force controller 308. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle comprising:
a first detector configured to detect first road surface information related to a road surface condition of a first road surface, the first road surface being a road surface at a current position that drive wheels of the vehicle are in contact with;
a second detector configured to contactlessly detect second road surface information related to a road surface condition of a second road surface, the second road surface being a road surface positioned in front of the vehicle; and
a controller configured to control a driving force of the vehicle using a road surface friction coefficient estimated based on one or both of the first road surface information and the second road surface information,
wherein the controller includes one or more processors, and one or more memories coupled to the one or more processors, and
the one or more processors are configured to execute a process comprising:
determining whether the road surface condition of the first road surface and the road surface condition of the second road surface are of a same type of road surface condition based on the first road surface information and the second road surface information;
based on determining that the road surface condition of the first road surface and the road surface condition of the second road surface are of different types of road surface conditions, controlling the driving force of the vehicle using a second road surface friction coefficient estimated based on the second road surface information as a road surface friction coefficient of the second road surface; and
based on determining that the road surface condition of the first road surface and the road surface condition of the second road surface are of the same type of road surface condition, controlling the driving force of the vehicle using a first road surface friction coefficient estimated based on the first road surface information, instead of the second road surface friction coefficient, as the road surface friction coefficient of the second road surface,
wherein:
the first detector is configured to detect, as the road surface condition of the first road surface, left first road surface information related to a road surface condition of a left first road surface which is a road surface on left relative to a direction of travel of the vehicle, and right first road surface information related to a road surface condition of a right first road surface which is a road surface on right relative to the direction of travel of the vehicle;
the second detector is configured to contactlessly detect, as the road surface condition of the second road surface, left second road surface information related to a road surface condition of a left second road surface which is a road surface on left relative to the direction of travel of the vehicle, and right second road surface information related to a road surface condition of a right second road surface which is a road surface on right relative to the direction of travel of the vehicle; and
the one or more processors are configured to
independently calculate respective upper limits of driving forces of left drive wheels and right drive wheels of the drive wheels using respective road surface friction coefficients of the first road surface and the second road surface, and control the driving force of the vehicle,
determine whether the road surface condition of the left first road surface and the road surface condition of the left second road surface are of a same type of road surface condition based on the left first road surface information and the left second road surface information, and determine whether the road surface condition of the right first road surface and the road surface condition of the right second road surface are of a same type of road surface condition based on the right first road surface information and the right second road surface information,
based on determining that the road surface condition of the left first road surface and the road surface condition of the left second road surface are of the same type of road surface condition, calculate an upper limit of the driving force of the left drive wheels using a left first road surface friction coefficient estimated based on the left first road surface information, instead of a left second road surface friction coefficient estimated based on the left second road surface information, as a road surface friction coefficient of the left second road surface, and based on determining that the road surface condition of the right first road surface and the road surface condition of the right second road surface are of the same type of road surface condition, calculate an upper limit of the driving force of the right drive wheels using a right first road surface friction coefficient estimated based on the right first road surface information, instead of a right second road surface friction coefficient estimated based on the right second road surface information, as a road surface friction coefficient of the right second road surface.

2. A vehicle comprising:
a first detector configured to detect first road surface information related to a road surface condition of a first road surface, the first road surface being a road surface at a current position that drive wheels of the vehicle are in contact with;
a second detector configured to contactlessly detect second road surface information related to a road surface condition of a second road surface, the second road surface being a road surface positioned in front of the vehicle; and
a controller configured to control a driving force of the vehicle using a road surface friction coefficient estimated based on one or both of the first road surface information and the second road surface information,
wherein the controller includes one or more processors, and one or more memories coupled to the one or more processors, and
the one or more processors are configured to execute a process comprising:
determining whether the road surface condition of the first road surface and the road surface condition of the second road surface are of a same type of road surface condition based on the first road surface information and the second road surface information;
based on determining that the road surface condition of the first road surface and the road surface condition of the second road surface are of different types of road surface conditions, controlling the driving force of the vehicle using a second road surface friction coefficient estimated based on the second road surface information as a road surface friction coefficient of the second road surface; and
based on determining that the road surface condition of the first road surface and the road surface condition of the second road surface are of the same type of road surface condition, controlling the driving force of the vehicle using a first road surface friction coefficient estimated based on the first road surface information, instead of the second road surface friction coefficient, as the road surface friction coefficient of the second road surface,
wherein:
the one or more processors are configured to
when the road surface condition of the first road surface and the road surface condition of the second road surface are of the different types of road surface conditions, and the road surface condition of the first road surface is better than the road surface condition of the second road surface, control the driving force of the vehicle using the second road surface friction coefficient as the road surface friction coefficient of the second road surface, and
when the road surface condition of the first road surface and the road surface condition of the second road surface are of the different types of road surface conditions, and the road surface condition of the first road surface is worse than the road surface condition of the second road surface, control the driving force of the vehicle using the first road surface friction coefficient as the road surface friction coefficient of the first road surface, wherein:
the first detector is configured to detect, as the road surface condition of the first road surface, left first road surface information related to a road surface condition of a left first road surface which is a road surface on left relative to a direction of travel of the vehicle, and right first road surface information related to a road surface condition of a right first road surface which is a road surface on right relative to the direction of travel of the vehicle;
the second detector is configured to contactlessly detect, as the road surface condition of the second road surface, left second road surface information related to a road surface condition of a left second road surface which is a road surface on left relative to the direction of travel of the vehicle, and right second road surface information related to a road surface condition of a right second road surface which is a road surface on right relative to the direction of travel of the vehicle; and
the one or more processors are configured to
independently calculate respective upper limits of driving forces of left drive wheels and right drive wheels of the drive wheels using respective road surface friction coefficients of the first road surface and the second road surface, and control the driving force of the vehicle,
determine whether the road surface condition of the left first road surface and the road surface condition of the left second road surface are of a same type of road surface condition based on the left first road surface information and the left second road surface information, and determine whether the road surface condition of the right first road surface and the road surface condition of the right second road surface are of a same type of road surface condition based on the right first road surface information and the right second road surface information,
based on determining that the road surface condition of the left first road surface and the road surface condition of the left second road surface are of the same type of road surface condition, calculate an upper limit of the driving force of the left drive wheels using a left first road surface friction coefficient estimated based on the left first road surface information, instead of a left second road surface friction coefficient estimated based on the left second road surface information, as a road surface friction coefficient of the left second road surface, and
based on determining that the road surface condition of the right first road surface and the road surface condition of the right second road surface are of the same type of road surface condition, calculate an upper limit of the driving force of the right drive wheels using a right first road surface friction coefficient estimated based on the right first road surface information, instead of a right second road surface friction coefficient estimated based on the right second road surface information, as a road surface friction coefficient of the right second road surface.

3. The vehicle according to claim 1, further comprising:
an external information receiver configured to receive external information related to the road surface condition of the second road surface from an information distribution device coupled to the vehicle via a network,
wherein the one or more processors are configured to control the driving force of the vehicle using the external information instead of the second road surface information as road surface information related to the road surface condition of the second road surface when the second road surface information is undetectable by the second detector.

4. The vehicle according to claim 2, further comprising:
an external information receiver configured to receive external information related to the road surface condition of the second road surface from an information distribution device coupled to the vehicle via a network,
wherein the one or more processors are configured to control the driving force of the vehicle using the external information instead of the second road surface information as road surface information related to the road surface condition of the second road surface when the second road surface information is undetectable by the second detector.

* * * * *